UNITED STATES PATENT OFFICE.

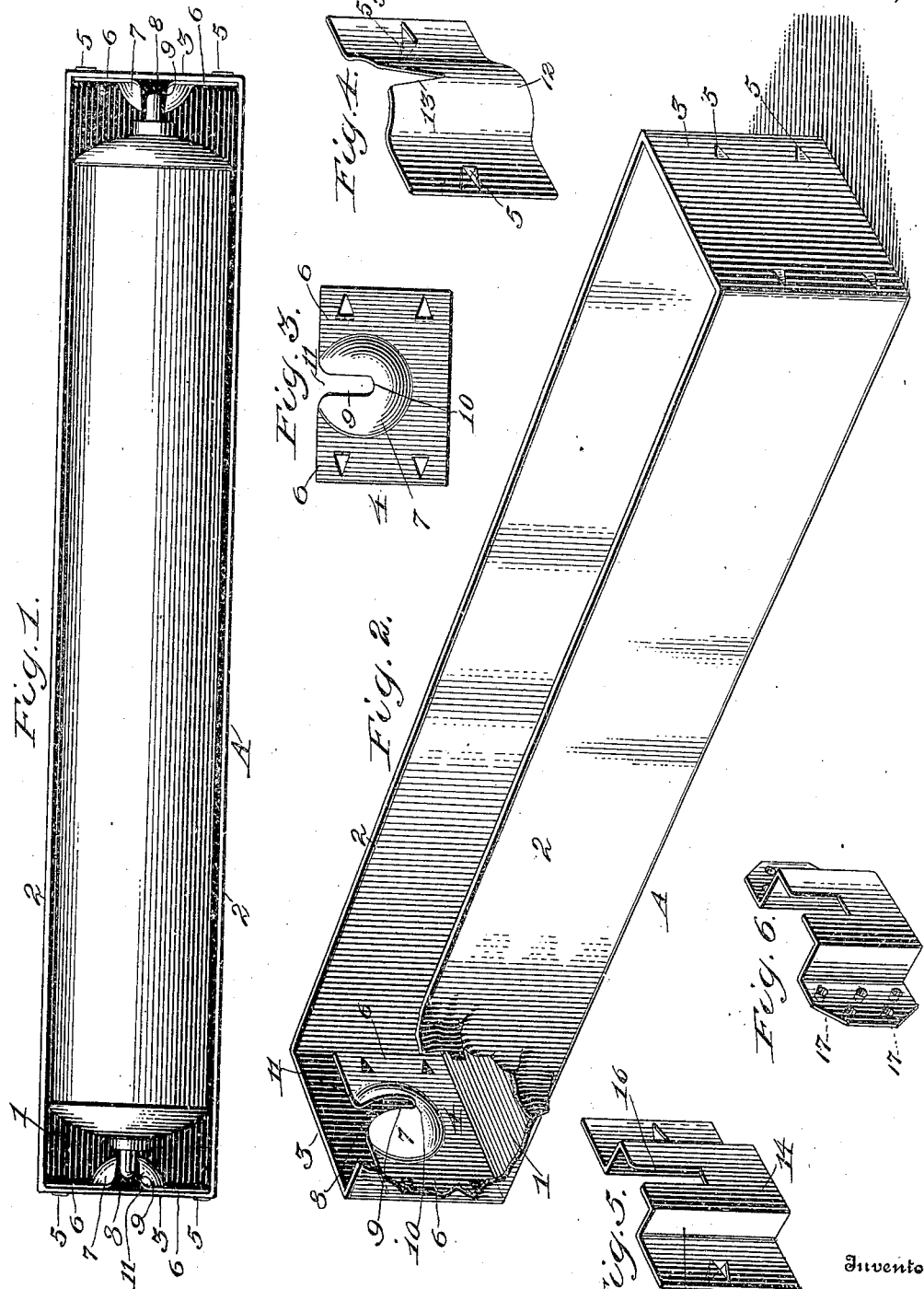

WILLIAM KREUZKAMP AND CHARLES T. BOWMAN, OF SCHENECTADY, NEW YORK, ASSIGNORS TO G. HOWLETT DAVIS, OF WEST ORANGE, NEW JERSEY.

BOX OR RECEPTACLE.

952,263.  Specification of Letters Patent.  Patented Mar. 15, 1910.

Application filed September 7, 1905. Serial No. 277,467.

*To all whom it may concern:*

Be it known that we, WILLIAM KREUZKAMP and CHARLES T. BOWMAN, citizens of the United States, residing at Schenectady, in the county of Schenectady and State of New York, have invented new and useful Improvements in Boxes or Receptacles, of which the following is a specification.

Our invention has relation to new and useful improvements in boxes or receptacles constructed to contain spools or bobbins, and the object is to provide a box of ordinary and well-known construction with means for supporting therein spools or bobbins, which are provided with gudgeons or journals, such as the spools upon which the note sheets for automatic musical instruments are rolled, which means will be simple in construction and extremely inexpensive of manufacture.

The invention consists in providing the end walls of a box or receptacle with supporting plates, each of which is formed with an outstanding portion having a seat or bearing to receive a journal on the spool or bobbin, means being provided for guiding the said journal to its seat whereby the spool or bobbin may be readily and quickly placed in proper position in the box.

We have fully and clearly illustrated our invention in the accompanying drawings, to be taken as a part of this specification and wherein—

Figure 1 is a top plan view of an open receptacle, showing the spool supporting devices embodying our invention, disposed therein and also showing the spool supported in said devices; Fig. 2 is a perspective view of the receptacle, one of the side walls thereof being broken away to show one end of the spool supporting devices located in the end of said receptacle; Fig. 3 is a view in front elevation of one of the spool supporting devices; Fig. 4 is a perspective view of a modified form of our invention; and Figs. 5 and 6 are perspective views of further modifications.

Referring to the drawings, A designates a box or receptacle shown as being rectangular in form and of such dimensions and material as will best suit it to the particular purpose for which it is desired. This box comprises a bottom 1, longitudinal vertical side walls 2, 2, and opposite vertical end walls 3, 3, said walls being joined at their meeting edges in any suitable manner to provide a durable article.

Each of the opposite end walls 3, 3, above referred to, has secured thereto and supports a supporting device, which is constructed to receive one of the journals of a spool or bobbin, said supporting-device being constructed whereby the said journal may be easily and quickly engaged therewith or removed therefrom, and formed with integral attaching means constructed to engage the vertical end wall of the box whereby the device is secured in position without the employment of cement or separate fastening devices. These supporting devices each consist of a vertically disposed plate 4, preferably stamped out from sheet-metal, said plate being arranged on the inside of the box in engagement with the inner face of the end wall 3, and secured thereto by means of prongs 5, struck up from said plate and embedded in said end wall. The supporting plate 4 is preferably formed to consist of two side wings 6, 6, which are disposed in surface contact with the said end wall 3, and an intermediate outstanding portion 7, the latter projecting inwardly into the box or receptacle whereby a space 8 is provided between the outstanding portion and the end box wall to which the supporting plate is attached.

In the embodiment of the invention shown in Figs. 1, 2 and 3 of the drawing, the outstanding portion 7 is shown as consisting of a semi-spherical boss or nose, and this boss is formed with a bearing or seat to receive the journal of the spool or bobbin, said seat consisting of a vertically disposed slot 9 extending centrally through the said boss, the lower end of the slot terminating adjacent the center of the boss as at 10, and the upper end of the slot opening through the upper edge of the plate 4, as at 11. The opening 11 to the slot or guideway 9 is flush with the surface of the end wall 3. The side edges of the slot 9 are preferably flared outwardly from the lower end thereof, toward the upper end to facilitate the placing of the journals of a spool or bobbin in said slot and to guide said journals into position in the lower end of the slot.

By reference to the drawing it will be seen that each of the end walls 3, 3, of the box is provided with one of the supporting plates constructed or formed as above described, and it will be understood that the slots 9, 9, constituting the journal supporting bearings for the spool or bobbin, are in longitudinal alinement, and preferably so located that when the spool or bobbin is placed in the box, the journals thereof will be seated in said slots and the sides of the spool held out of contact with the bottom and side walls of the box. It will be seen that when a spool or bobbin is placed in the box, the journals thereon will project through the plate into the space 8, afforded between the outstanding portion and the face of the end wall, the outstanding portion extending such a distance within the box as to prevent the spool journals from coming into contact with the box wall, and thereby punch or wear a hole therethrough or otherwise disfigure or impair the same.

In Fig. 4 we have illustrated a modified form of the invention, in which the outstanding portion of the supporting plate instead of being made in the form of a semi-spherical boss, is formed by flexing the plate at its central vertical portion so as to provide an inwardly projecting curved portion 12, which extends from top to bottom of the plate, and is formed at its upper central portion with a V-shaped recess 13, which opens through the upper edge of the curved portion of said plate. This V-shaped recess or slot 13, forms a seat for the journal of a spool or bobbin in the same manner as the slot 9 shown in the form of the invention illustrated in Figs. 1, 2 and 3. The form of the invention shown in Fig. 4 also embodies the integral prongs 5, by means of which the supporting plate is secured to the box wall.

A further modification is shown in Fig. 5, in which the outstanding portion on the vertical plate is formed by bending the central portion of said plate outwardly to form a vertical wall 14, disposed in a plane substantially parallel to the vertical plate, and joined thereto by edge portions 15, extending at right angles to said wall and plate. This form of the invention also embodies the journal receiving slot shown at 16, and integral prongs for securing the plate to the box wall.

Fig. 6 illustrates a further modification, in which the general features of construction are substantially the same as that shown in Fig. 5, but instead of having integral prongs to form its attaching means, the plate is formed with cluster-burs 17, which constitute an efficient securing means for the plate.

Having thus described our invention, what we claim and desire to secure by Letters Patent is:—

1. A receptacle of the character described, comprising a rectangular box having roll-supporting plates secured against the inner ends thereof and being in width coextensive with said ends and having integral tangs adapted to be stuck through the end walls of said box in order that the plates may be secured thereto, said plate formed with a semi-spherical, inwardly-bulged portion with its horizontal circumference flush with the coöperative face of the box, bearings in said bulged portion having upwardly diverging slotted guide ways in alinement with the vertical circumference of said bulged portion.

2. A bearing of the character described, comprising a plate having integral tangs struck up therefrom, said plate being formed with a semi-spherical bulged portion therein, with its horizontal circumference flush with the coöperative face of said plate, said bulged portion being formed with a slot having upwardly diverging guide ways therein and in alinement with the vertical circumference of said bulged portion.

In testimony whereof we have hereunto set our hands in presence of two subscribing witnesses.

WILLIAM KREUZKAMP.
CHARLES T. BOWMAN.

Witnesses:
D. VEDDER CLUTE,
ANNA DE GRAFF.